United States Patent
Pope et al.

(10) Patent No.: US 8,640,771 B2
(45) Date of Patent: Feb. 4, 2014

(54) DETERMINATION OF COAL BED NATURAL GAS PRODUCTION FACTORS AND A SYSTEM TO DETERMINE SAME

(75) Inventors: John M. Pope, Laramie, WY (US); Rick Cox, Laramie, WY (US); Daniel Buttry, Tempe, AZ (US)

(73) Assignee: Gas Sensing Technology Corp., Laramie, WY (US)

( * ) Notice: Subject to any disclaimer, the term of this patent is extended or adjusted under 35 U.S.C. 154(b) by 244 days.

(21) Appl. No.: 11/855,945

(22) Filed: Sep. 14, 2007

(65) Prior Publication Data

US 2012/0227960 A1 Sep. 13, 2012

Related U.S. Application Data

(63) Continuation of application No. PCT/US2006/009087, filed on Mar. 14, 2006.

(60) Provisional application No. 60/661,152, filed on Mar. 14, 2005.

(51) Int. Cl.
*E21B 47/06* (2012.01)
*E21B 47/00* (2012.01)

(52) U.S. Cl.
USPC .......... 166/250.01; 166/250.17; 166/264

(58) Field of Classification Search
USPC ............... 166/250.01, 250.17, 264
See application file for complete search history.

(56) References Cited

U.S. PATENT DOCUMENTS

| 5,494,108 | A | 2/1996 | Palmer et al. | |
| 6,678,050 | B2 * | 1/2004 | Pope et al. | 356/435 |
| 7,216,702 | B2 | 5/2007 | Carlson | |
| 2004/0178336 | A1 * | 9/2004 | DiFoggio | 250/269.1 |
| 2012/0312530 | A1 * | 12/2012 | Pope et al. | 166/250.01 |

OTHER PUBLICATIONS

International Search Report for PCT/US06/009087, mailed Nov. 6, 2006.
Written Opinion of the International Search Authority for PCT/US06/009087, mailed Nov. 6, 2006.

* cited by examiner

*Primary Examiner* — Giovanna Wright
(74) *Attorney, Agent, or Firm* — David McEwing

(57) ABSTRACT

Well fluids in coalbed natural gas reservoirs and other carbonaceous reservoirs are analyzed to determine production factors such as gas content, critical desorption pressure, and/or other reservoir and operational variables. In particular, the partial pressure of methane or a predictor substance, or a methane concentration, are measured and/or determined for the wells and production factors are determined therefrom.

22 Claims, 16 Drawing Sheets

DETERMINATION OF COAL BED NATURAL GAS PRODUCTION FACTORS AND A SYSTEM TO DETERMINE SAME

CROSS REFERENCE TO RELATED APPLICATIONS

This application is a continuation of International Application No. PCT/US2006/009087, filed Mar. 14, 2006 and entitled "Determination of Coal Bed Natural Gas Production Factors and a System to Determine Same," which claims priority to U.S. Provisional Patent Application No. 60/661,152, filed Mar. 14, 2005 and entitled "Determination of Coal Bed Natural Gas Production Factors and a System to Determine Same," both of which are hereby incorporated by reference in their entireties.

BACKGROUND OF THE INVENTION

1. The Field of the Invention

The present invention relates to a method and system of determining gas content, dewatering time, critical desorption pressure, and/or other reservoir and operational variables, referred to as production factors, for coalbed natural gas wells. The present invention also relates to determining these production factors for other carbonaceous material reservoir wells including carbonaceous shale, shales, tight sands, and muddy sands or other methane reservoirs wherein the methane is at least partially dissolved in water within the reservoir. In particular, this invention relates to a method and system for measuring a partial pressure of methane or a predictor substance for a coalbed natural gas reservoir and determining production factors therefrom.

2. The Relevant Technology

With reference to FIG. 1, a typical completed coalbed natural gas well includes a borehole which is drilled to at least a depth of a coal seam. During drilling and completion of the well an initial borehole is drilled to or through one or more coal seams and a casing is set to at least the top of the lowest coal seam. Each coal seam of interest is then accessed from the wellbore either by perforating holes from the wellbore into the coal seam, or by open hole completion of the wellbore at the lowest coal seam. In many cases the wellbore contains water which originates from one or more layers of the geological strata, including some coal seams, through which the borehole is drilled, or that may be residual from the drilling and completion process. In many instances the coal seams of interest are wet which means that the coal contains water in at least some portion of the coal seam. In some cases the coal seams can be dry or partially dry which means that the coal seam has no or limited amounts of water. In some cases, coal seams are stimulated or otherwise treated using techniques such as fracturing, acid treatment, recirculation of water, and other known methods.

Typically, production of methane is initiated by pumping fluid from the well to reduce the pressure on the coal seam. This fluid typically contains dissolved methane, termed "solution gas." When the overall hydrostatic pressure of the well at the depth of the coal seam is lowered to the critical desorption pressure of the methane contained within the coal seam, further reductions in pressure lead to off-gassing of methane. At this point the well is considered to be in production. When a well is pre-production, the primary fluid flow through the reservoir is condensed phase, typically water. When a well is in production, both gas and condensed phase fluid flow through the reservoir, typically in competition. Gas flow is due to expansion of the gas after it devolves from the coal. Condensed phase fluid flow is due to continued pumping of that fluid from the wellbore throughout most of the life of the well. In some cases, for wells that have been substantially dewatered and that have little or no hydrostatic pressure remaining, reduced pressure systems, e.g. vacuums, may be installed to further reduce the reservoir pressure and devolve and produce further gas.

Depending upon the reservoir conditions and the coal type, formations, depth and other geological characteristics, fluid from a well may need to be pumped for a very short time (e.g. not at all, if overpressurized with gas) or for a very long time (e.g. up to four years or longer for severely gas undersaturated or low permeability coals) in order to reach production. The life of the well during which it produces economical amounts of methane, and the amount of gas that is produced during that time, also varies depending on the amount of methane entrained, contained, adsorbed or otherwise present in the coal bed. In certain circumstances the life of a well may be up to 30 years or longer.

Traditionally, coal bed methane production factors have been determined by a variety of methods. One known method of determining the critical pressure which the well must reach in order to produce methane by off-gassing involves retrieval of a core sample of the coal, transportation of the core sample to a laboratory setting, and quantification of the amount of methane contained within the sample coal via gas desorption. As seen in FIG. 2, this quantity is then analyzed to determine the coal gas content and compared to an adsorption isotherm of the same or a similar coal in order to determine the critical desorption pressure of the coalbed reservoir. The isotherm of the coal or coal gas content curve represents the amount of methane the coal may contain depending upon the pressure. More particularly, the sample of the coal from the reservoir itself is subjected to reduced pressure over time to measure the amount of methane which it contained. To this measurement is added a "lost gas" estimation to account for gas that issued from the coal sample during retrieval. The total amount of methane is then plotted on the isotherm chart and a correlation is made to the ideal curve. Where the saturation gas curve and measured gas content intersect is the critical pressure which must be reached by pumping in order for the well to produce methane. Other factors may be deduced from this plot or map. Unfortunately, this process is expensive, time consuming, and error-prone.

BRIEF SUMMARY OF THE INVENTION

An aspect of certain preferred embodiments of the invention provides that a production factor such as gas content, dewatering time, critical desorption pressure, and/or other reservoir and operational variables can be determined via measurement or determination of methane partial pressure or another substance or substances indicative of the methane partial pressure.

Those skilled in the art will recognize that reference to a partial pressure of gas dissolved in a fluid is related to the amount of that gas that is dissolved in that fluid and that would be in equilibrium with a vapor phase in contact with that fluid. Use of the term "partial pressure of gas in fluid" is meant to encompass, but not be limited to, related terms such as concentration, effective density, quantity, potential volume, potential pressure, and amount.

The critical desorption pressure of the coal bed methane reservoir or coal seam is equal to the methane partial pressure of the reservoir or coal seam. By determining the effective methane partial pressure of the coal, reservoir fluid or well fluid the critical desorption pressure may be determined. If the system is in physical and chemical equilibrium the partial pressures of methane for the reservoir, coal, reservoir fluid and well fluid are all equal. However, in practice this is not always the case as many variables may affect the partial pressures and their interrelation to one another. In such cases other measurements or determinations may be used to correlate the partial pressures.

Other production factors may be determined utilizing the partial pressure of methane via correlation, modeling, calculation, and other sensor data.

The measurement of the partial pressure of methane can be accomplished via measurement of a dissolved methane concentration. Preferably, the measurement of the concentration is done at a depth of the coal seam and as near to the coal seam as possible so that other variables and effects are lessened. This concentration is then correlated to a partial pressure of methane of the well fluid, reservoir fluid or coal reservoir. The partial pressure of methane within the coal reservoir is then used to determine the critical desorption pressure along with a gas content of the coal reservoir, dewatering time and other reservoir and operational variables.

The measurement or determination of the partial pressure may also be accomplished in other ways such as by direct measurement of the partial pressure via instrumentation or another variable which correlates to the partial pressure of methane.

In a preferred embodiment, the methane concentration or another substance's concentration dissolved in a coal seam reservoir fluid is measured at a depth in the well at or near the coal seam of interest. This concentration is then correlated to a partial pressure of methane in the fluid. This partial pressure of methane in the fluid is then correlated to the partial pressure of methane in the reservoir which equates to the critical desorption pressure.

In certain preferred embodiments of the invention a method for determining a production factor or gas content of a coal seam is achieved by direct measurement of methane concentration of the wellbore fluid. This measurement in combination with a known or determined solubility property for methane in water allows the calculation of the partial pressure of methane in the wellbore fluid.

If the fluid in the wellbore is in equilibrium with the reservoir fluid, which in turn is in equilibrium with the coal seam itself, the hydrologic and physical connection between these fluids and the coal allows that the measurement of one of these partial pressures can be correlated into a measurement of the other two. The partial pressure of the fluids is controlled by the amount of methane present in the coal seam. More simply stated; when more methane is present in a particular coal seam, the partial pressure of methane in the fluids is higher.

The methane partial pressure of the coal seam is the critical desorption pressure, which is the saturation point of the coal seam at that pressure. Dewatering of the well acts to lower the total fluid pressure to a value at or below the critical desorption pressure, which causes devolution of methane out of the coal seam as free gas.

Having determined the critical desorption pressure, by further utilizing an isotherm of the interested coal seam calculations can be made to determine the gas content of the coal seam and estimate the total methane reserves. As well, the critical desorption pressure can be compared to the rate of decrease of the total reservoir pressure during dewatering, the rate of flow of water from the coal seam, and other reservoir and operational variables, in order to predict dewatering time, permeability, and other production factors.

The concentration of the methane or other substance or the partial pressure of methane in the reservoir fluid may be measured by optical spectrometers, membrane-covered semiconductor sensors, mass spectrometers or the like.

The concentration which is measured may be directly correlated to a partial pressure of methane in the reservoir or any intermediate quantity that is relatable to the amount of methane in the fluid or parts of the fluid. Each coal seam has unique properties which may affect the correlations. By using an intermediate correlation these properties may be used to enhance the accuracy and precision of the partial pressure determination of the methane in the reservoir.

The production factors which may be determined are gas partial pressure, percent saturation of gas in coal, gas content, bookable reserves, permeability, porosity, relative permeability, critical desorption pressure, dewatering time, solution gas, stage of production, cone of depression, cross-seam water and gas flow, water salinity, identification of contributing seams and formations, density, coal friability, cleat and fracture structure including size, distribution and orientation, dewatering area and volume, degassing area and volume, gas concentration, reservoir pressure, gas recovery factor, gas-in-place, water and gas production rates and timetables, well lifetime, optimum well spacing, optimum production procedures including choice of which seams in multizone wells and which wells in a pod should be produced first, second, etc., optimum completion procedures including choice of which seams and wells to complete first, second, etc., which to abandon or sell, and how to complete and produce the desired wells, effectiveness of prior completion and production activities, indication of regions and seams of favorable production potential, and other production factors which will be apparent to those skilled in the art.

Another aspect of the invention is an apparatus and/or system which measures the partial pressure of methane or another substance indicative of the methane or measures a precursor variable such as the concentration of methane to allow or produce a determination of the methane partial pressure of the reservoir. The system may include a pressure transducer. The pressure transducer can measure the total pressure of the fluid at the measurement point. The transducer can also measure a gas pressure down a wellbore when the methane is evolved from the water.

Preferably, the concentration or partial pressure is measured by Raman spectroscopy. This may be accomplished by lowering a probe or housing within the well which contains the spectrometer or parts thereof or by guiding a radiation from a radiation source into the well and onto the fluid at or near the coal seam from the spectrometer located outside of the well. Characteristic radiation may also be guided from the fluid to the spectrometer located outside the well. Most preferably, the measurement is conducted on the fluid without first sampling the fluid. During sampling, the fluid is necessarily transported and disturbed. By measuring the fluid outside of an instrument package and in-situ the resultant concentration or Partial pressure is more accurate.

Other objects, advantages and novel features of the present invention will become apparent from the following detailed description of the invention when considered in conjunction with the accompanying drawings.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE DRAWINGS

In the following description, numerous specific details are set forth in order to provide a thorough understanding of the present invention. It will be obvious, however, to one skilled in the art that the present invention may be practiced without these specific details. In other instances, well-known aspects of various items such as coal bed methane wells and optical scanning systems have not been described in particular detail in order to avoid unnecessarily obscuring the present invention.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

While the following description is directed to coal bed methane wells, it should not be seen as limiting the scope of the invention thereto.

Figure 3:
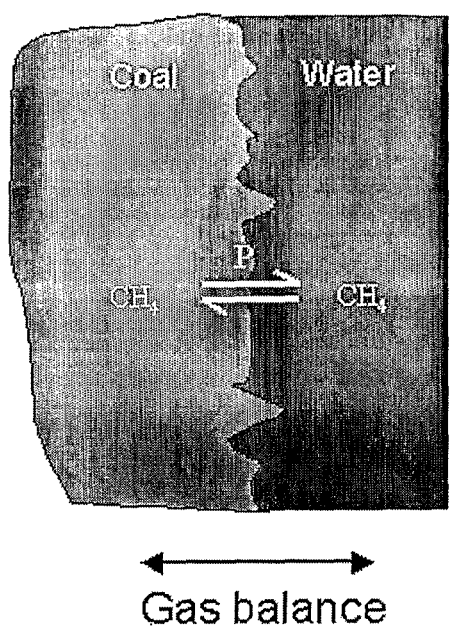
FIG. 3 shows a diagram of the coal bed-reservoir fluid system in equilibrium.

As seen in FIG. 3, the methane present in the coal bed is interrelated to the methane of the reservoir fluid which in turn is interrelated to the methane present in the well fluid. As the pressure is reduced on the well fluid, the pressure is in turn reduced on reservoir fluid and in turn reduced on the coal reservoir. Under some conditions, the coal reservoir, reservoir fluid and well fluid are initially at equilibrium. When one of these is changed the others are affected. The changes are not instantaneous. For example, a reduction of the pressure in the well fluid propagates from the well into the coal reservoir first affecting the pressure of the reservoir fluid and then the pressure of the coal reservoir. The propagation of the change, whether it is pressure, concentration of a substance or the like, may depend on many factors including the fluids, the coal reservoirs, permeability, porosity, density and cleating of the coal. However, given time the change propagates as the system moves toward equilibrium by affecting the coal reservoir, reservoir fluid and well fluid properties.

When the methane present in the well fluid, reservoir fluid and coal reservoir are at equilibrium, these quantities are interrelated and a measurement of one can be correlated into a measurement of all of them. As the fluid pressure is decreased in the wellbore fluid, the fluid pressure of the reservoir fluid is reduced and the pressure of the coal reservoir is reduced. In response to this pressure reduction, in most instances, the reservoir fluid simply flows into the wellbore and becomes wellbore fluid as the two are hydrologically connected. As the surrounding fluid pressure of the coal reservoir is reduced the coal reservoir seeks the new equilibrium and intra coal seam fluid flow occurs. When the pressure of the coal reservoir reaches the critical desorption pressure, methane gas begins to flow from the coal itself. This process is what occurs when the well is dewatered by pumping wellbore fluid. The water level or head is reduced so that the pressure is reduced and gas is produced.

During drilling the water or fluids are disturbed and mixed with other strata fluids. Given time the fluid or fluids come into equilibrium with each other and the reservoirs of the well.

In some cases, the partial pressure of methane may be reduced in wellbore fluids by intermingling with other fluids. In some cases the equilibrium between the methane adsorbed on the coal and the partial pressure of methane in the reservoir fluid may be affected by introduction of another gas or other material that displaces the methane from the coal. This production enhancement method can affect the required completion and production conditions.

The wellbore and reservoir as seen in FIG. 3 fluids have an effect on each other as well as on the coal reservoir. A concentration of a substance in the fluid, a pressure or other variable can locally change for the well fluid. This in turn affects the reservoir fluid and the coal reservoir. The change propagates into the reservoir fluid and coal, and the system responds by seeking to reestablish equilibrium. When a continuous change is effected, such as when the well is continuously dewatered, a flux or gradient develops between the well fluid and the reservoir fluid and coal. If the variables of the change, such as permeability, rate of dewatering, rate of pressure change or other variables, are known then the concentration, pressure or the like may be calculated for a given point within the reservoir fluid or coal. This calculation may assist in determining the characteristics of the reservoir based upon a measurement of the well fluid when the well fluid is out of equilibrium with the reservoir. Thus, a measurement of the gas content or critical pressure of the methane for the coal reservoir may be calculated during dewatering, i.e. under non-equilibrium conditions. A computer model may be used to determine the flux or difference in concentration or pressure as well as measurements of other variables such as the porosity, flow characteristics or other flux variables present in the well and reservoir.

In the case of methane in coalbed reservoir fluids, the partial pressure of methane is directly affected by the amount of methane contained or present in the coal bed reservoir and by the ease with which that methane can adsorb, absorb or otherwise be contained within the coal. For a given coal, the more methane that is present in the coalbed reservoir, then the higher the partial pressure of methane in the fluids. Thus, the partial pressure of methane in the reservoir fluid is directly related to the amount of methane in the coal reservoir. As the fluid pressure is reduced as with dewatering a well, reservoir fluid is transported from the coal reservoir to the wellbore. Once the partial pressure of methane at the depth of the coal seam equals the total fluid pressure, any further reduction in pressure causes the methane to transport off of or out of the coal reservoir as gas. An example of this is when dewatering causes the overall reservoir pressure to be lowered below the critical desorption pressure in a coalbed natural gas well and gas production to commence.

Therefore, by determining a partial pressure of methane in the reservoir fluid the critical desorption pressure can be determined. As the partial pressure of methane is dependent on the amount of methane in the coal reservoir the partial pressure of methane does not significantly change for a system at equilibrium. The partial pressure of methane in the coal reservoir fluid remains constant as long as the fluid pressure is above the critical desorption pressure. This constancy of the methane partial pressure in the coal reservoir fluid can be observed, for example during a dewatering process when the hydrostatic pressure on the fluid is being continuously reduced. Thus, the partial pressure of methane of the reservoir fluid is the critical desorption pressure for the coalbed reservoir.

Figure 4:
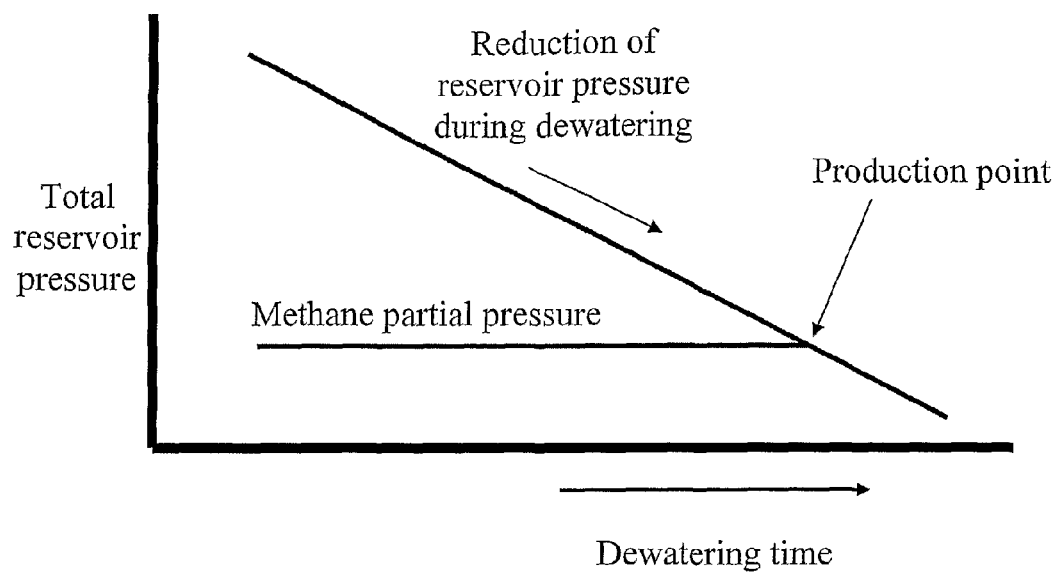
FIG. 4 shows a graph of a dewatering measurement.

As the partial pressure of methane of the reservoir fluid is interrelated to the partial pressure of methane of the well fluid, by measuring the partial pressure of methane of the well fluid the critical desorption pressure can be determined. This, in turn, given an isotherm of the coal, can establish the coal gas content of the coalbed reservoir as well as dewatering time, given the rate of pressure change, and can also provide an estimation of the methane reserves within the coal reservoir. As shown in FIG. 4 the total reservoir pressure over time during dewatering may be plotted based on a linear or fitted curve and compared against the methane partial pressure. The dewatering time may then be determined.

Direct measurement of the partial pressure of the methane in the fluid or fluids can be made by a METS sensor or a total gas pressure sensor with an appropriate filter. A measurement of a substance which is indicative of the methane partial pressure may also be used such as carbon dioxide or nitrogen or other substances which chemically or physically interact with the methane in the reservoir.

Another way of determining the partial pressure is by direct physical observation of the fluid in the well. In a wellbore, fluids near the bottom of the well can contain higher concentrations of methane and fluids near the top of the well can contain lower concentrations of methane. In other words, the saturation limit of methane in water increases with increasing pressure, which increases with increasing water head or depth. For a wellbore fluid that contains dissolved methane, that methane will remain dissolved at depths where its concentration is lower that the saturation concentration and will cavitate as gas bubbles, to some extent, at depths where its concentration is higher than the saturation concentration. The depth at which cavitation commences is that depth at which the water head pressure is equal to the methane partial pressure. At depths above this point, the methane partial pressure exceeds the water head pressure and cavitation occurs. At depths below this point, the methane partial pressure is less that the water head pressure and cavitation does not occur. By observing the depth at which cavitation occurs, it is possible to calculate the partial pressure of methane in the wellbore fluid. Due to the well water being saturated with methane at every depth above that point, the well water will cavitate or form bubbles of methane at those depths. A video camera, acoustic device, bubble counter, thermocouple or other transducer of the lice which is sensitive to the presence or evolution of bubbles in a fluid may be used to observe the depth at which the water head pressure is equal to the methane partial pressure. The pressure at this depth is then equal to the partial pressure of methane within the system or well fluid at the coal seam. This method of determining the partial pressure has several drawbacks in that other gases could be cavitating which would affect the observation and other dynamics of the well could offset the determination. In addition, supersaturation and nucleation effects in the fluid can introduce errors into the determination of the cavitation commencement depth. Another approach to determining cavitation is to use an optical spectrometer that can differentiate between the spectroscopic signature of methane dissolved in water and the gas phase methane in the bubbles. The difference in spectroscopic signature frequently manifests as a shift in the absorption peak or Raman scattering peak for methane or other gases indicative of methane, as well as changes in the width of such peaks. This method does not suffer from all of the drawbacks listed above, only the effects of supersaturation and nucleation, as well as dynamics of the well.

Another way of determining the partial pressure of methane within the system or well fluid is by capping the well and allowing the system to reach equilibrium. The capped well produces gaseous methane which fills the headspace of the well along with other gases. These other gases can be water vapor, carbon dioxide or other reservoir gases. By measuring the pressure of the head space the total pressure of the gases is obtained. Within this total pressure the partial pressure of the methane is included. If the other reservoir gases are subtracted out, by measurement or by assumption, or assumed to be near zero, then the resultant pressure is the partial pressure of the methane As this partial pressure of methane would be the partial pressure of methane in the system the critical desorption pressure would be known. This method is similar to a sipper tube or canister which draws in well fluid or reservoir fluid and is taken out of the well for analysis of the partial pressure of the methane in a similar manner.

In such cases a sample of the reservoir fluid under reservoir pressure and temperature conditions in a sealed vessel or in a tube or other conveyance in which pressure is controlled—i.e. either maintained as constant or varied in a known and reproducible manner—is collected. The sample is allowed to come to equilibrium, or a relationship between the sample state and equilibrium is determined or estimated. The pressure of the vessel is measured, and the fraction of that pressure which is due to the gas or gases of interest is measured or assumed. From those quantities, the partial pressure of the gas or gases of interest is calculated Another example uses a sample collected and handled as above, in which localized, microscopic or macroscopic changes in vessel pressure are induced in order to induce gas evolution from the fluid. The system is allowed to come to equilibrium, or a relationship between the system state and equilibrium is determined. The pressure of the vessel is measured, and the fraction of that pressure which is due to the gas or gases of interest is measured or assumed. From those quantities, the partial pressure of the gas or gases of interest is calculated. This method has several drawbacks in that other gases including water vapor interfere with the measurement and creates uncertainty. The assumptions associated herewith as well as the necessity of having equilibrium in the well and fluid collection make this method undesirable.

Another example of determining the partial pressure directly is to submerge a vessel with a known volume, containing known or assumed fluids or gases and equipped with a gas-permeable membrane, into reservoir fluid or a wellbore, and the dissolved gases in the water are allowed to equilibrate with fluid(s) and/or gas(es) in the headspace, then the gas partial pressure in the headspace is measured with a pressure transducer or other transducer sensitive to the pressure, activity, fugacity or concentration of the gas or gases of interest. This can be combined with a sensor that identifies the fraction of the headspace volume (and thus partial pressure) that is due to the gas or gases of interest.

The fluid within the well may also be physically altered. In one example of this method to determine the partial pressure one may stimulate cavitation in a reservoir fluid using a source of energy such as a sonic gun or the like and correlate the extent of cavitation as a function of energy to the partial pressure of the gas or gases of interest. In another example of this method, the reservoir fluid may be heated using a variety of heating devices, including immersion heaters, microwave generators, or injection of steam of other hot fluids into a device, pipe or other container in contact with the fluid. The resulting increase in temperature will reduce the solubility of the methane in the fluid. The correlation of cavitation to heat input and/or temperature rise can be correlated to the partial pressure.

Of course another substance's concentration besides methane can also be measured to determine its partial pressure within the system. With this method the system should be at or near physical and chemical equilibrium in order to determine the partial pressure as it is at or in the coalbed reservoir.

Another example of a method of directly determining the partial pressure is to retrieve a volume of coal from the coal seam and seal the sample in a container at the reservoir conditions. This sample can then be allowed to off-gas methane in a sealed volume. When the sample comes to equilibrium the pressure in the sealed volume is the partial pressure of methane in the coal. This method is problematic in that retrieval of a sample without affecting the methane partial pressure of that sample is difficult.

Figure 5:
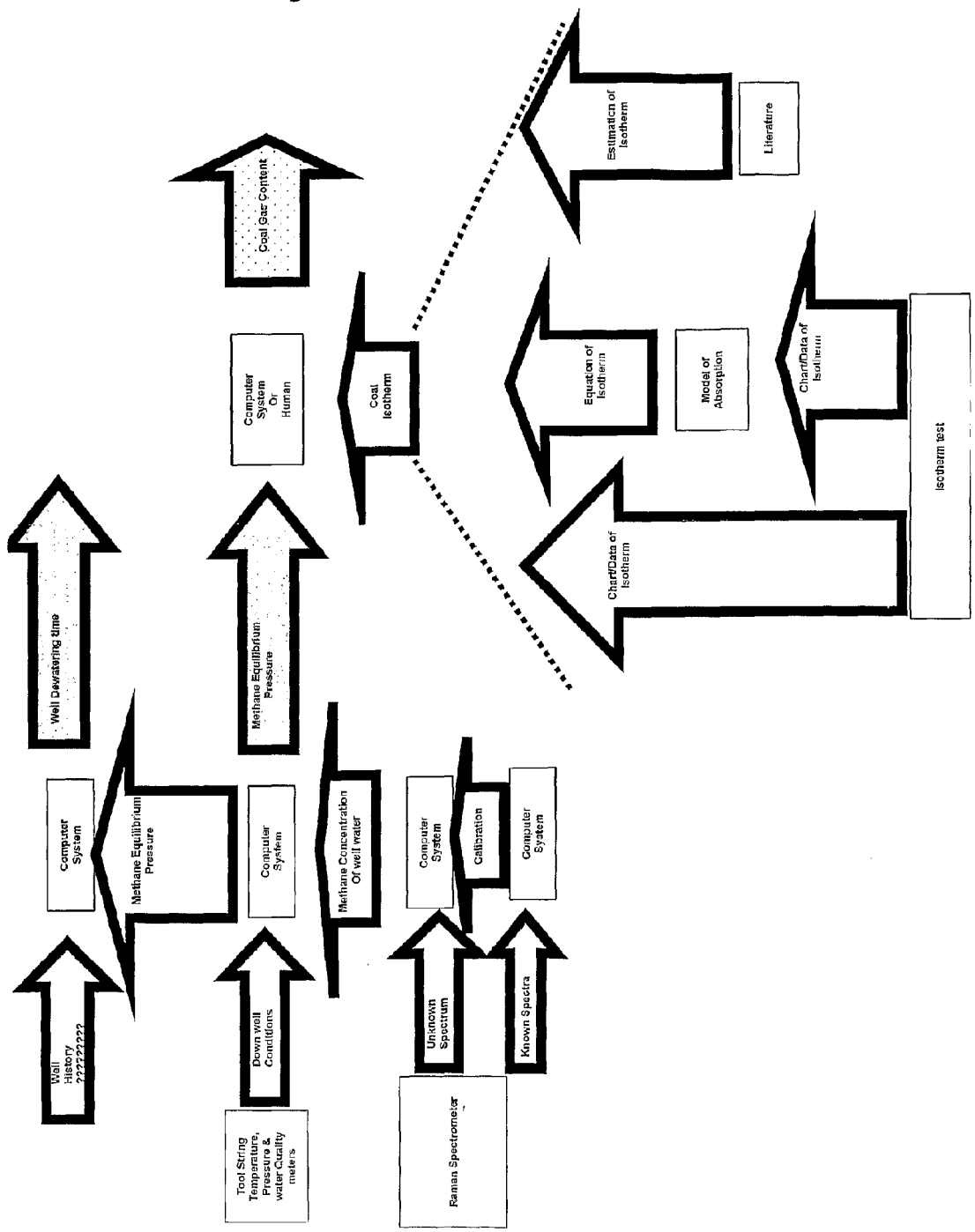
FIG. 5 shows a process diagram of the measurement system.

Another determination of the partial pressure of methane in the fluid or fluids may be made by measuring the concentration of methane or other substance indicative thereof. As seen in FIG. 5 the following example is directed toward a method involving measuring a concentration of the methane in order to determine the partial pressure of the reservoir fluid and in turn to determine production factors, but should not be considered as limiting the method or apparatus.

A method of certain preferred embodiments of the invention involves measuring a concentration of methane dissolved in a coalbed reservoir fluid, correlating that concentration to a partial pressure of methane in the fluid, correlating that partial pressure to the partial pressure of methane in the reservoir, and correlating that partial pressure of methane in the reservoir to a gas content in the coal as well as determining other production factors.

Figure 6:
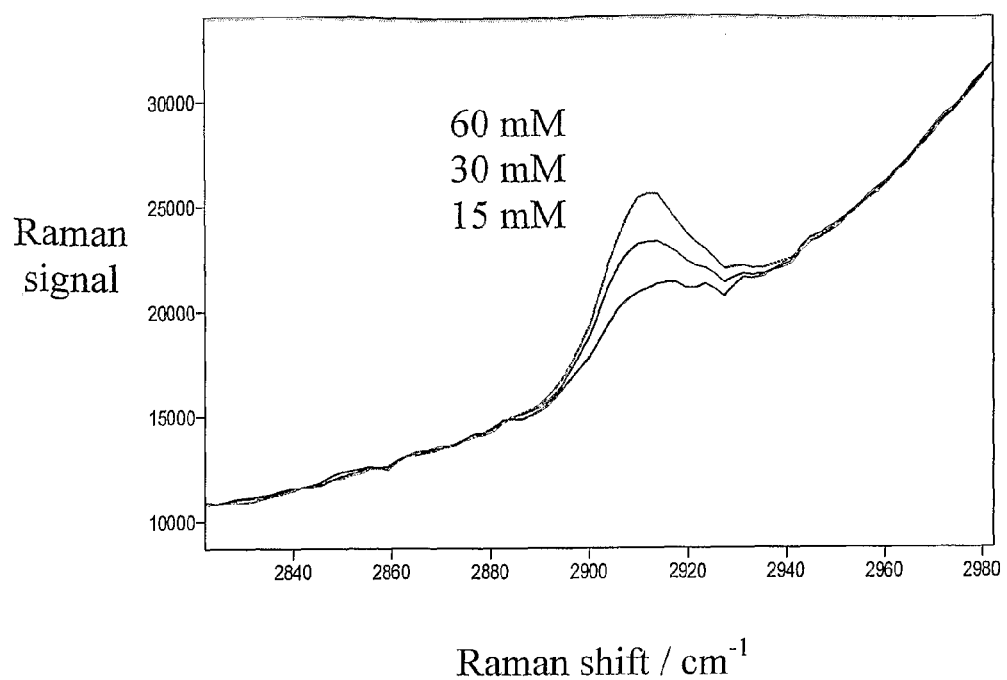
FIG. 6 shows a graph of a spectral signature for methane at three different concentrations.

For example, FIG. 6 shows the Raman spectral signature of methane dissolved in water for three different samples having different methane concentrations.

Figure 7:
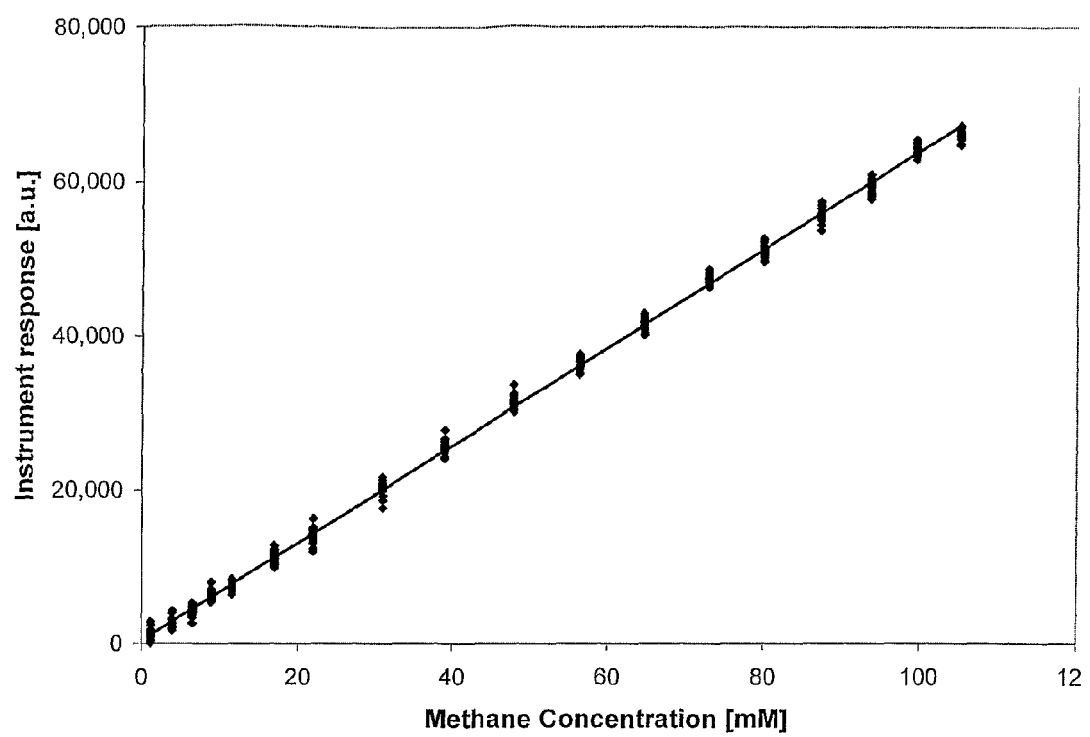
FIG. 7 shows a graph of a calibration between signal to methane concentration.

By correlating the signals measured for a series of samples with the concentrations of methane dissolved in the samples, it is possible to create a calibration between signal and concentration. FIG. 7 shows such a calibration for Raman signal responses to methane dissolved in water.

Dissolved methane concentration can then be calibrated to partial pressure of the methane in the reservoir fluid. For ideal fluids and conditions, this relationship is typically a simple linear relationship. For less than ideal fluids, or less than ideal conditions, this relationship may be complex. This relationship can be established for any fluid or condition by preparing samples of reservoir fluids under reservoir conditions, by impinging a partial pressure of methane onto the sample until the system is at equilibrium and by then measuring the concentration of methane. This process can be repeated for more than one partial pressure of methane until a relationship between dissolved methane concentration and partial pressure is established. Typically, the partial pressures impinged would be of magnitudes that include the partial pressure magnitude expected in the reservoir.

Figure 8:
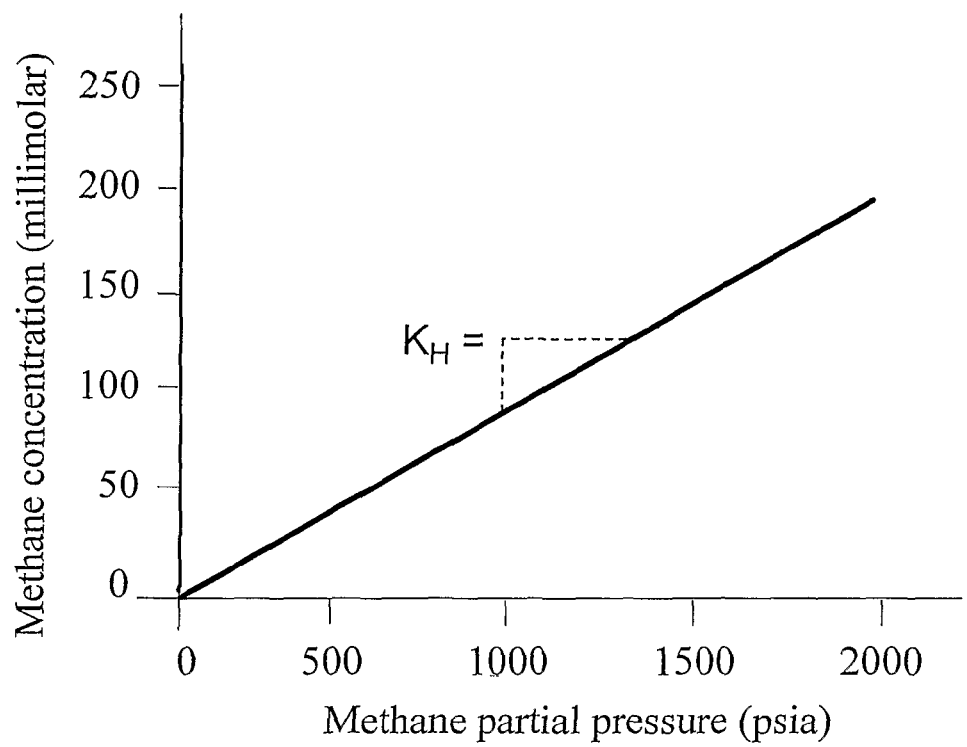
FIG. 8 shows a graph of a relationship between dissolved methane concentration and partial pressure of methane in a reservoir fluid.

For example, a relationship between dissolved methane concentration and partial pressure of methane typical of some coal seam reservoir fluids and coal seam reservoir conditions is shown in FIG. 8.

The methane partial pressure in a reservoir fluid can thus be determined by measurement of the dissolved methane concentration in that fluid.

The methane partial pressure in a reservoir fluid can then be used to determine the methane partial pressure in an overall reservoir. Under typical reservoir conditions, for fluids that are in physicochemical equilibrium with the reservoir, the methane partial pressure in a reservoir fluid or well fluid is equal to the methane partial pressure in the overall reservoir. For fluids that are not in physicochemical equilibrium with the overall reservoir, one may correct the partial pressure to reflect that state.

Figure 9:
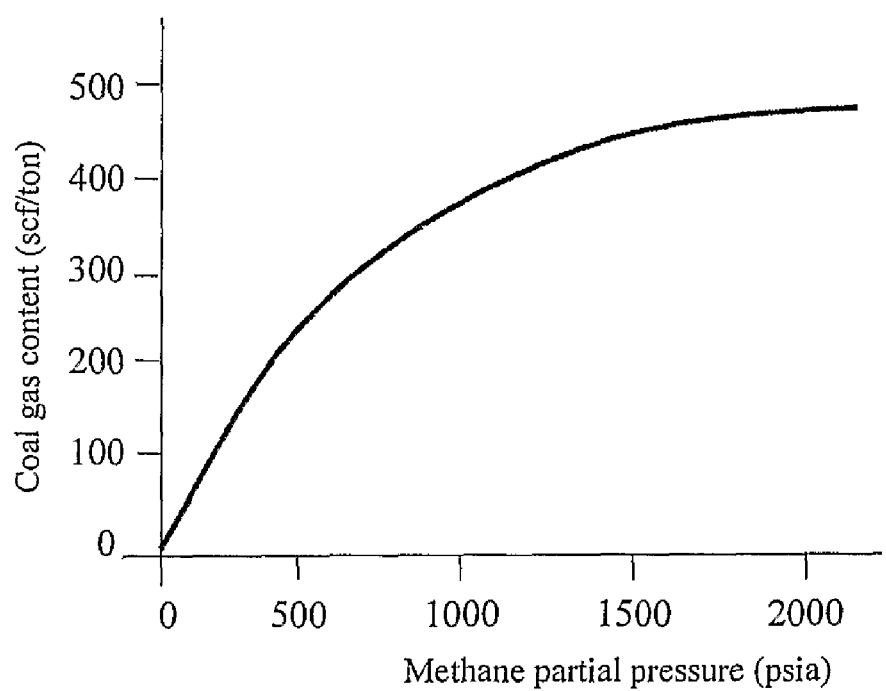
FIG. 9 shows a graphical representation of the relationship between methane partial pressure and coal gas content.

The methane partial pressure in a reservoir can then be used to determine the gas content of a coalbed reservoir. FIG. 9 shows such a relationship typical of coal.

Thus, measurement of the concentration of methane dissolved in a coalbed reservoir fluid can be used to analyze quantitatively the gas content of the coal.

Figure 10:
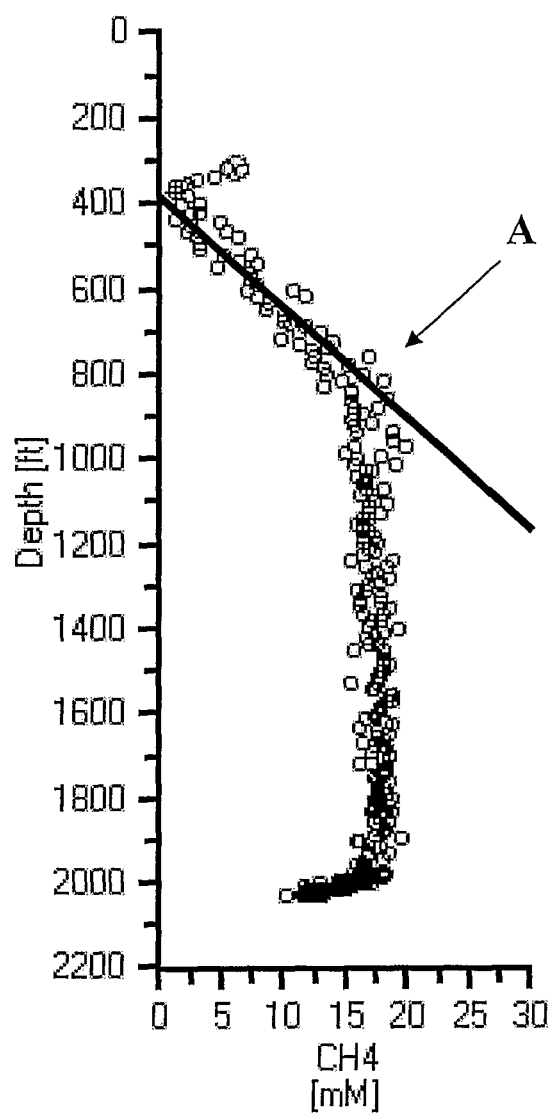
FIG. 10 shows a representation of a wellbore with concentrations plotted.

Another way of performing certain preferred embodiments of the invention are to measure the concentration of methane in the well at varying depths. This results in a plot of the concentration of methane versus the depth as shown in FIG. 10. The concentration of methane is shown plotted with Henry's law (solid line), or other models of the saturation limit of methane in water, against depth. As depth is increased, the measured concentration is saturated to a certain point A. At this point the concentration of methane in the water deviates from the saturation curve. This deviation point is indicative of the partial pressure of methane in the well fluid. The partial pressure of the methane in the well fluid is the head or pressure of the water at the deviation point. As the concentration of methane in a well does not change below the deviation point when the coalbed reservoir is not off-gassing, even one methane concentration measurement below the deviation point can determine the partial pressure of methane by correlation to Henry's law or a saturation curve. With reference to the discussion above, cavitation would occur in such a well at any location in the well bore fluid above Point A.

Other measurements made in a wellbore or on wellbore fluids or gases can be combined with the methane concentration to provide a detailed understanding of the coal seam reservoir properties and stage of production. This process can include measurement and/or analysis of reservoir pressure, reservoir temperature, ionic strength of reservoir fluids, saturation limit of methane dissolved in water under reservoir conditions, depth and thickness of coal seams, coal rank, coal thickness, coal ash content, coal masceral content, wellbore diameter, wellbore total depth, casing size, casing type, cement type, cement volume used, perforation locations, perforation sizes, perforation hole density, historical water production volumes and rates, historical gas production volumes and rates, completion and production methodology, cone of depression, reservoir models, well structures, and other relevant variables.

Measurement of the dissolved methane concentration in a reservoir fluid can occur using a number of different methods and apparatus.

Measurements can be made downhole in a well that is drilled into a reservoir, and manipulated to contain the reservoir fluid. Such measurements can be made using an optical spectrometer, such as a Raman spectrometer. Such measurements can be made using a membrane-coated semiconductor sensor. Such measurements can be made using a mass spectrometer. Such measurements can be made using a sensor such as an optical spectrometer in tandem with a sample collector such as a formation tester or with a fluid control system such as a coiled tubing pump system. Such measurements can be made using a nuclear magnetic resonance spectrometer or a radio frequency, acoustic frequency, or microwave frequency spectrometer. Such measurements can be made using any transducer or sensor that provides a signal in response to methane concentration, including those transducers and sensors that may be less than quantitative in signal response.

Measurements can be made at the wellhead in a well that is drilled into a reservoir, and manipulated to contain the reservoir fluid. Such measurements can be made using standard laboratory analysis, e.g. via gas chromatography, on samples collected with various sampling apparatuses, including vessels that allow fluids of interest to flow into them and then seal, on samples that are collected at the wellhead using a pressure-regulated pumping system, and on other samples collected using methods obvious to those skilled in the art.

In some cases, fluids in a wellbore are not representative of a reservoir. For example, a wellbore drilled into more than one coal seam may contain commingled fluids that are representative of both reservoirs, in some ratio. In these cases, concentration measurements can likewise reflect the properties of both reservoirs, in some ratio.

Wellbores and wellbore fluids can be manipulated in order to ensure that the wellbore fluid properties, most specifically the methane concentration but also the temperature, pressure, ionic strength, and/or other physicochemical properties, reflect the reservoir properties of interest. For example, wells can be completed in only one coal seam so that other coal seams or geologic intervals cannot contribute fluids to the wellbore. In another example, the wellbore fluids in a well drilled into a coal seam can be allowed to equilibrate with the coal seam reservoir until the wellbore fluids reflect the properties of the coal seam reservoir. In another example, the wellbore fluids can be extracted from the wellbore in order to induce fluid flow from the reservoir into the wellbore until the wellbore fluids reflect the properties of the reservoir of interest. In another example, multiple coal seams in a well can be isolated using bridge plugs, packers, or other such apparatuses. The wellbore fluids in the isolated regions can then be allowed to equilibrate with the associated coal seam reservoirs, or one or more isolated regions can be evacuated with pumps or other mechanisms in order to induce fluid flow from the coal seam into the isolated regions until the fluids in the isolated regions reflect the coal seam reservoir properties of interest.

To manipulate wellbore fluids, the aforementioned formation tester, or other packer/pump assembly, can be used to extract fluid from the sidewall of a well until the fluid extracted represents the desired reservoir property. In one case, this could involve using the formation tester to extract fluid from one coal seam, in a wellbore that contains fluids commingled from more than one coal seam, until the fluid contained in the formation tester reflects only the properties of that one coal seam reservoir. Then, the concentration measurement could be performed on that sample either at the surface or in the well.

Fluid manipulations can be used to draw fluids from various places in a reservoir, and thus provide the opportunity to analyze the properties of those places without drilling a well to them. For example, key reservoir variables of a coal seam near a wellbore can be analyzed by measuring the methane concentration and other properties of a wellbore fluid. The wellbore fluid can then be removed from the wellbore so that additional fluids flow from the coal seam into the wellbore. At some established time, the wellbore fluids can again be analyzed with the expectation that the fluids reflect the properties of the reservoir farther from the wellbore. In another example, a portion of the sidewall can be covered so that fluid is removed from the surrounding coal reservoir in only one cardinal direction. Thus, the rate of fluid removal, and the properties of the fluid and substances that it contains, can indicate reservoir properties of interest such as clearing orientation, fracturing orientation, and dewatering and production volume aspect ratio.

Figure 11:
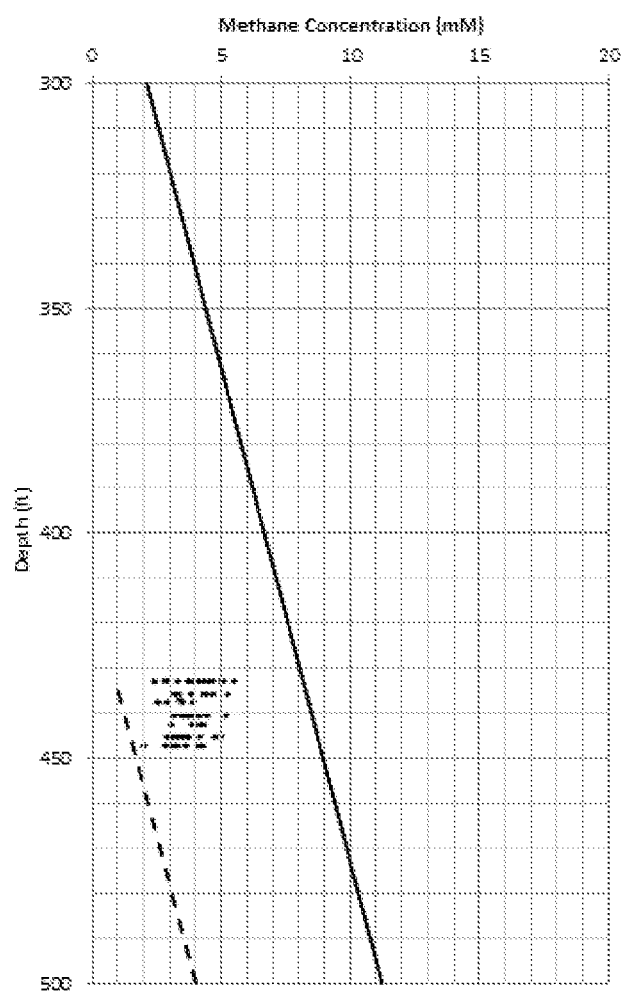
FIG. 11 shows a graph of a measurement when pumping is changed.

In one example of this technique, for a producing well that establishes a cone of depression near a wellbore, when the pump in that well is turned off the fluids from the surrounding coal reservoir flow into the wellbore. Near the wellbore, those fluids may be saturated in methane due to depressurization of the wellbore. Farther from the wellbore, those fluids may not be saturated because the cone of depression does not reach their region. By analyzing the methane concentration as a function of flow time, the cone of depression extent can be ascertained. This extent can be used to draw conclusions regarding whether the coal seam is being effectively depressurized and for how long the coal will produce gas at that pressure. As shown in FIG. 11 the Henry's law saturation curve during pumping is represented (solid line) as well as the saturation curve for when the pump is turned off (gray line). By measuring concentrations of methane (solid circles) after the pump is turned off and plotting against the saturation curves, the relation between the curves and the concentrations show how effective the well is being produced as well as indicating the slope of the cone of depression, and thus dewatering time and permeability. Concentrations of methane near the pump off curve indicate that the well is being produced effectively and that dewatering time has been long and/or permeability is high as well as a very small cone of depression. Concentrations close to the saturation curve for when the pump is on indicate that the cone of depression may be large and dewatering time has been short and/or permeability is low.

In some instances one coal seam can be extremely large. Some seams may be 100 feet or larger in thickness. By measuring at different places along the coal seam the resultant partial pressures may be used to identify and determine production factors that may not be representative of one measurement. A cone of depression may actually be able to be identified if the cone of depression has vertical stratification along the seam. Other variables for the seam may also be determined via measuring along the entire width.

Measuring the methane concentration in a reservoir fluid, and analysis of other reservoir properties, thus allows analysis of critical desorption pressure, dewatering time and volumes, and other key reservoir and operating variables.

Figure 12:
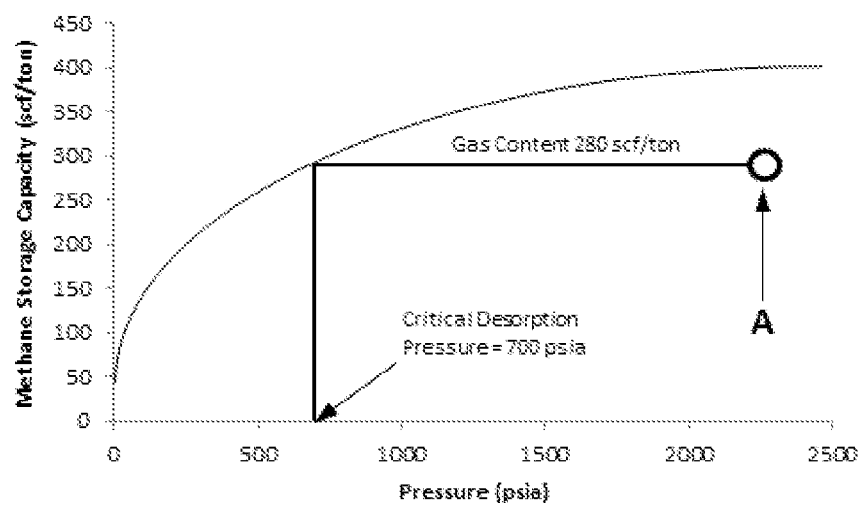
FIG. 12 shows a diagram of an isotherm calculation based on a critical pressure.

For example, FIG. 12 represents a map of gas content and total reservoir pressure. The line indicates where in that space the coal gas content is saturated. Measurement of methane concentration, and thus gas content, for a coal at a certain reservoir pressure allows mapping of that particular reservoir onto this space. Reservoirs that adhere to the saturation line contain coals saturated with gas. Reservoirs that do not adhere to the saturation line contain coals that are undersaturated with gas.

Point A indicates an example reservoir that is undersaturated with gas. In order for gas to be produced from that coal, the overall pressure must be reduced until equal to the methane partial pressure, termed the critical desorption pressure. Thus, measurement of dissolved methane concentration allows direct quantitative analysis of critical desorption pressure.

Figure 1:
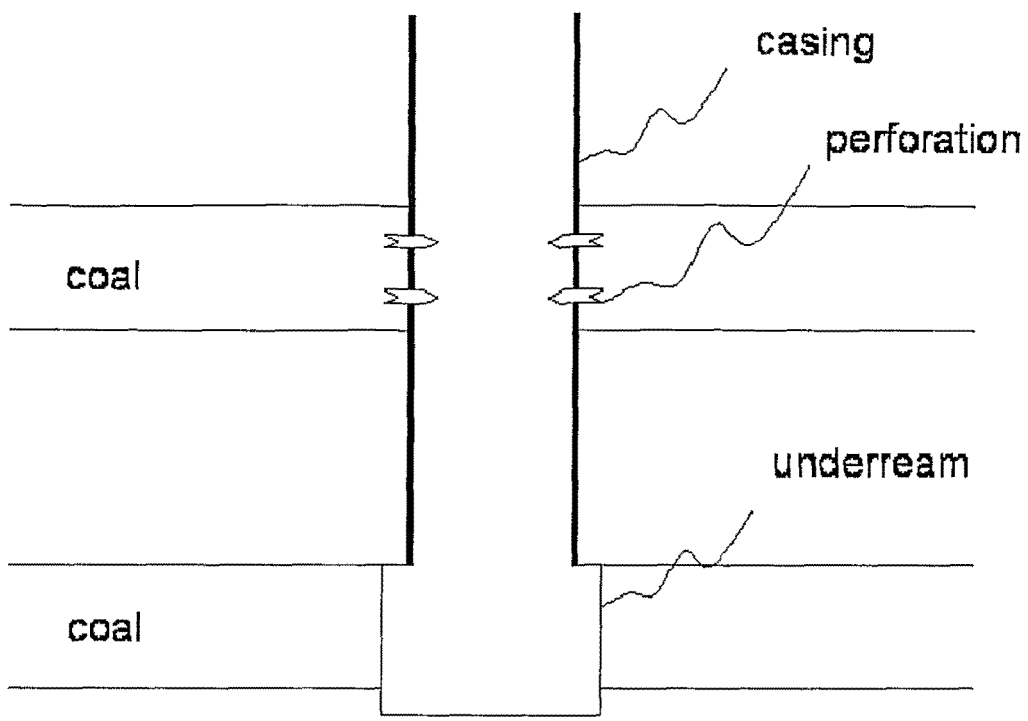
FIG. 1 shows a completed coalbed methane wellbore.
Figure 2:
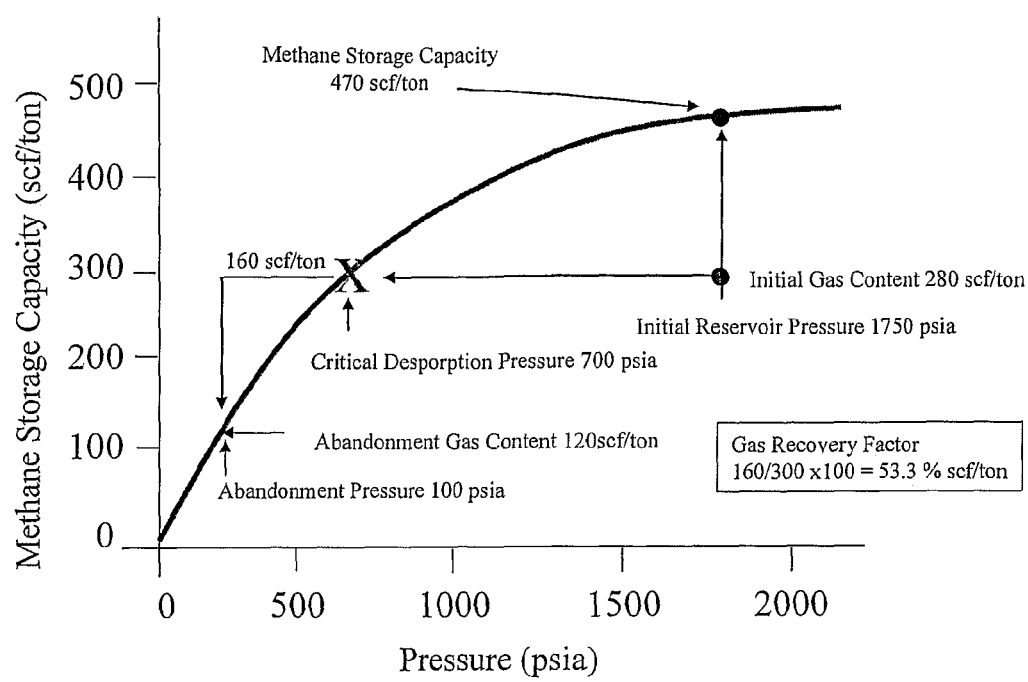
FIG. 2 shows a diagram of an isotherm calculation based on a gas content.

Further analysis is possible using this type of map. FIG. 2 shows some examples. By determining the pressure at the coal seam the saturation of the coal can be determined with reference to the isotherm. The gas recovery factor may also be determined by determining the abandonment pressure and correlating to the isotherm then calculating the recovery factor based upon the critical desorption pressure.

Figure 13:
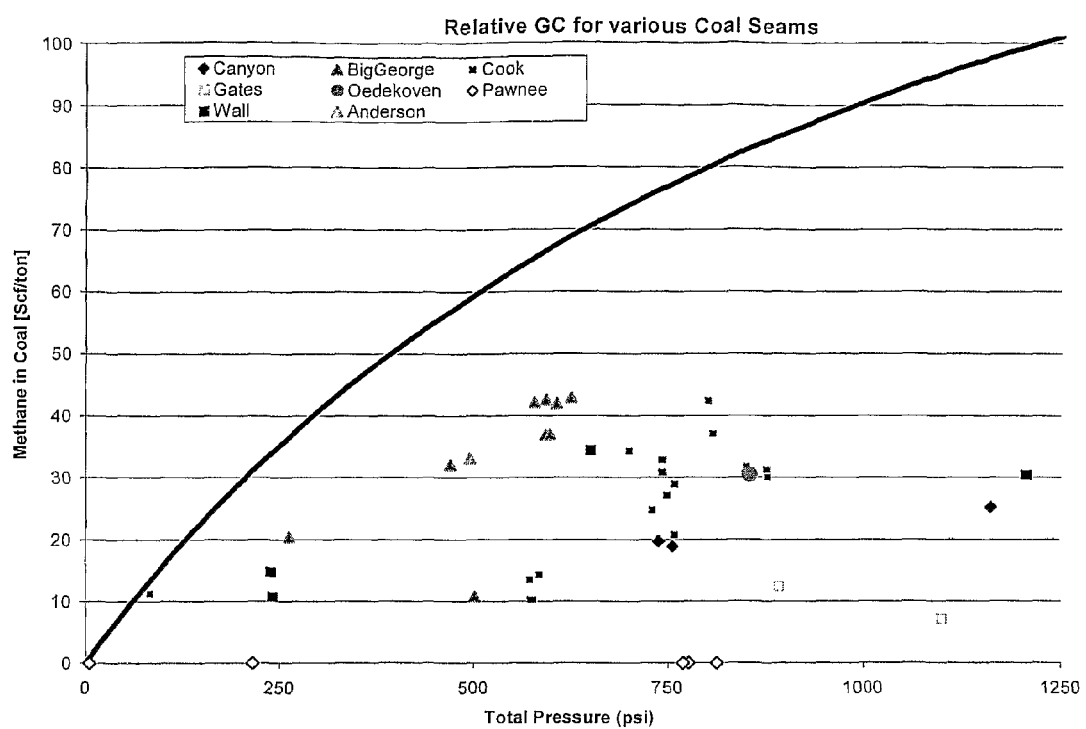
FIG. 13 shows a graph of multiple tests for various wells as plotted on an isotherm.

By measuring methane concentration in more than one wellbore, it is possible to map more than one reservoir area (or more than one coal seam) onto a coal gas content versus pressure map as shown in FIG. 13. By doing so, it is possible to determine which coal seams will provide the most gas production in the least amount of time and/or with the least amount of water production.

In some cases, the saturation line is the same or nearly the same for more than one area of coal or more than one coal seam, allowing direct comparisons to be made. In other cases, the saturation line must be measured, e.g. by adsorption isotherm analysis of cuttings, in order to allow comparison.

Figure 14:
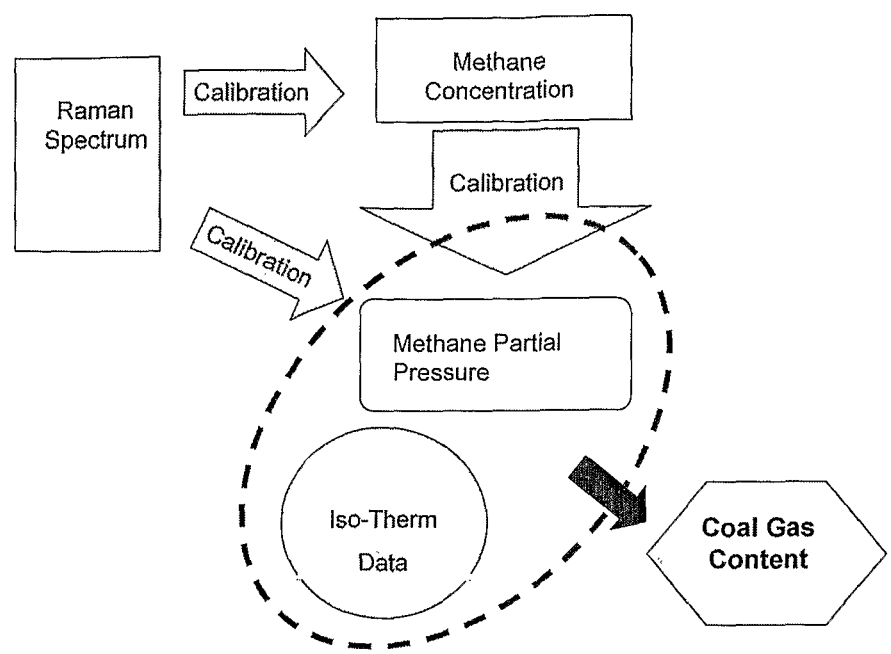
FIG. 14 shows a flow chart of measurements for a spectrometer.

Conversion of a Raman spectrum of coal bed fluid to a gas content is based on scientific principles. An exemplary conversion process is summarized below and shown in FIG. 14. First Raman measurements are taken as well. Temperature, pressure, and conductivity are also measured or provided. In one embodiment and as described elsewhere herein, using this data the Raman spectra measurements are analyzed to determine methane concentration data, which are in turn analyzed to determine methane partial pressure data. Alternatively, as also described elsewhere herein, the Raman spectra can also in some instances be converted directly the methane partial pressure data. The methane partial pressure data is then analyzed along with coal isotherm data to determine the coal gas content.

Working in reverse order, to calculate the gas content, the partial pressure of methane in the fluid surrounding the coal and the isotherm of the coal are provided. The isotherm is a correlation, at a given temperature, between the partial pressure of methane and the storage capacity of the coal, i.e. saturated methane gas content. The isotherm should be known or estimated externally to the Raman measurement. Thus, the goal in making the Raman measurement is to determine the partial pressure of methane in the fluid surrounding the coal.

In order to make this conversion between a Raman spectrum and methane partial pressure, the instrument is calibrated. This is done by one of two methods. Both involve preparing samples of methane in equilibrium with water at various pressures. Raman spectra of the samples are taken. The pressures of the samples should correlate with the range of methane partial pressures expected in the unknown samples.

The concentration of methane in each sample's fluid can be calculated by Henry's law, using an appropriate Henry's law constant for the given conditions, i.e. temperature, salinity and methane partial pressure, or by some other method that indicates the solubility of methane in water. This methane in fluid concentration can then be correlated with the intensity of the methane peak in the Raman spectra of the sample. This method is robust and has several advantages.

Alternately, the partial pressure of methane can also be directly correlated with the intensity of the methane peak in the Raman spectra.

With the above correlations, either methane concentration or partial pressure can be calculated by measuring the Raman spectrum of an unknown sample. Correlating directly to partial pressure, while simpler, introduces a larger possibility for error, as the unknown fluid may not have the same relationship between dissolved methane and partial pressure, i.e. Henry's law constant (or other solubility relationship). Conversely, correlating to concentration and then to partial pressure provides the advantage that the relationship between concentration and Raman signal will not be affected by differences in the fluid quality, without it being obvious in the Raman spectra, example: an unknown peak in the same spectral range as the methane. Subsequent conversion of methane concentration to partial pressure uses Henry's law and a Henry's law constant that is corrected for the unknown sample's temperature and salinity, which can be measured in a wellbore, for example. In both of these methods the partial pressure of methane is calculated. This then allows a direct reading from the isotherm (as shown in FIGS. 2 and 12) to determine the gas content.

Many factors such as localized depressurization may be taken into account when determining the partial pressure.

Another example of the steps to determine the partial pressure based upon an optical measurement of the methane concentration to reach partial pressure is as follows. First, construct a calibration of Raman or other spectrometer counts that relates those counts to methane concentration dissolved in water (preferably, an ideal water such as deionized water). This requires that one first apply a methane partial pressure at a room temperature and allow the system to come to equilibrium; preferably this is done for a pressure range that exceeds the range of interest in the well. Then, one measures the Raman signal from the methane in the ideal water sample and calculates the methane concentration dissolved in that sample. Then, one can correlate this concentration with the methane partial pressure that was applied, using a Henry's law constant for water at room temperature. This gives a calibration between Raman signal, concentration in the water and partial pressure of methane above the water at room temperature.

The function is:

moles of $CH_4$/moles of water=Pressure[atm]*Henry's constant [mM] $CH_4$=Pressure[atm]*Henry's constant*55 moles of water/liter water*1000

Second, record the Raman spectra of the unknown well sample, and its temperature and salinity.

Third, from the Raman measurement and the calibration, a concentration of the methane in the well water is calculated, via computer or model.

Fourth, with the methane concentration and a value of the Henry's law constant for the particular well temperature and salinity, calculate a methane equilibrium partial pressure. Values of Henry's law constant for temperatures and salinities of interest are available in published literature, or can be measured in the laboratory.

Fifth, obtain or generate a relationship between saturated coal gas content at the reservoir temperature versus methane partial pressure, where the coal is in a saturated moisture state, i.e. at its equilibrium moisture content. This can be a general isotherm for the type of coal or for more accuracy, the exact coal from the well.

Sixth, using the equilibrium methane partial pressure for the well conditions (methane content, temperature and salinity), calculate a gas content for the coal from the isotherm. With a valid isotherm for the coal, the methane content of the coal can be read off the isotherm with the partial pressure of methane. Another option is to use a Langmuir or other type of isotherm model equation to represent the true isotherm. The Langmuir and other model equations are equation versions of the isotherm. Using these one can calculate the gas content with the equation. Lastly, the accuracy of the values used for the Henry's law constant and the coal isotherm will have an effect on the accuracy of the calculations.

As described above, by measuring the partial pressure of methane or another indicative substance or by correlating the concentration of methane to partial pressure a production value can be obtained. The use of an ideal gas content curve or coal isotherm is needed in order to determine the coal gas content. As mentioned earlier a cutting or core sample of the coal may be used to determine the actual coal isotherm. However, an isotherm from a similar coal or coal type may be used as well as an isotherm which is representative of a coal, coal type, coal formation or coal basin/region. In such an instance a library of coals may be compiled in order to allow automated determinations based on the coal. This may result in a range of values dependent on the isotherms used. Another example of automating the determination of the coal gas content is by using a model based upon equations.

Below is a method of determining the gas content from the partial pressure of methane via an isotherm model for a wide range of coals. In this model the actual coal isotherm for the coal being measured need not be measured. However, to achieve a more accurate gas content an actual cutting or core and measurement of the coal can be done to determine the isotherm for the specific coal bed.

The correlation goes from Pm (methane partial pressure, which is obtained from the methane concentration and the appropriate value of the Henry's law constant) to G (coal gas content).

The Langmuir equation is:

$$\theta/(1-\theta) = Ka;$$

where $\theta$ is fractional gas coverage or gas content (i.e. $\theta = G/G_{sat}$ with $G_{sat} = G$ at saturation, in scf/ton), K is the binding constant for methane to the coal and a is thermodynamic activity, which is related to concentration and to "partial pressure of methane," $P_m$.

By analogy, a new Langmuir isotherm is defined:

$$G_{sat}\{\theta/1-\theta\} = K_b P_m$$

where, $K_b$ is the binding constant for methane to the coal in scf/ton psi. This formulation has G approaching $G_{sat}$ as $P_m$ goes to infinity. Now, using $\theta = G/G_{sat}$ $$G/\{1-(G/G_{sat})\} = K_b P_m;$$

$$G = K_b P_m - \{G K_b P_m/G_{sat}\};$$

$$G\{1+(K_b P_m/G_{sat})\} = K_b P_m$$

And finally, $$G = (K_b P_m)/\{1+(K_b P_m/G_{sat})\} \qquad \text{Equation 1}$$

With this comes G (coal gas content) from $K_b$ and $P_m$. The linearized reciprocal equation is:

$$1/G = 1/K_b P_m + 1/G_{sat} \qquad \text{Equation 2}$$

This linearized reciprocal equation was used to analyze the isotherm shown in FIG. 15 below (i.e. plot 1/G versus 1/P, which gives $1/G_{sat}$ as the intercept and $1/K_b$ for the slope). This gives an R value of 0.99953. It gives $G_{sat} = 178$ scf/ton and Kb=0.175 scf/ton psi.

Figure 15:
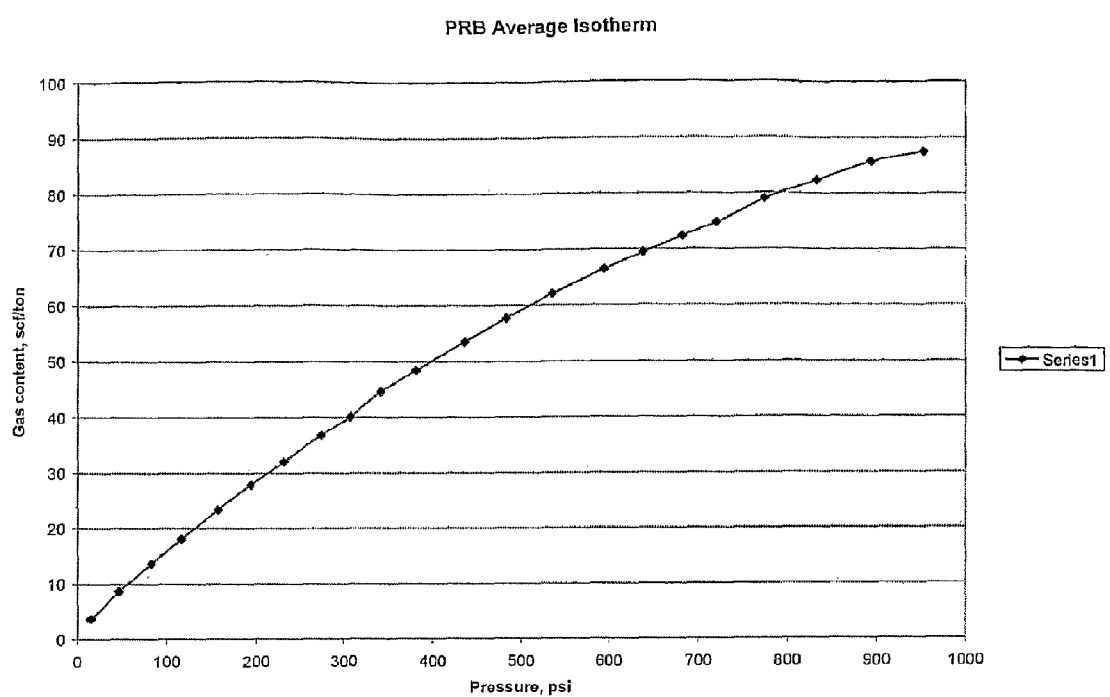
FIG. 15 shows an averaged coal isotherm.

Using Equation 1 above with these values, one can enter any value of $P_m$ and obtain the corresponding value of G for coals for which the typical isotherm in FIG. 15 is suitable. To predict the isotherm a bit more closely reiterations and other modifications can be done.

Methods of directly determining or measuring amount of gas in a coal seam or region of a coal seam can include, but are not limited to, spectroscopies in which energy travels into the coal seam and interacts with methane or substances indicative of the amount of methane. Examples include acoustic spectroscopy, microwave spectroscopy, ultrasonic spectroscopy, reflectometry, and the like. In an example case, microwave radiation of the appropriate wavelength is impinged on a coal seam, travels through the coal seam to an extent that allows sufficient interaction with methane, and a method of detection based on that interaction that provides the amount of methane entrained in the coal seam is used. That amount of methane is related to the gas content of the coal seam.

Figure 16:
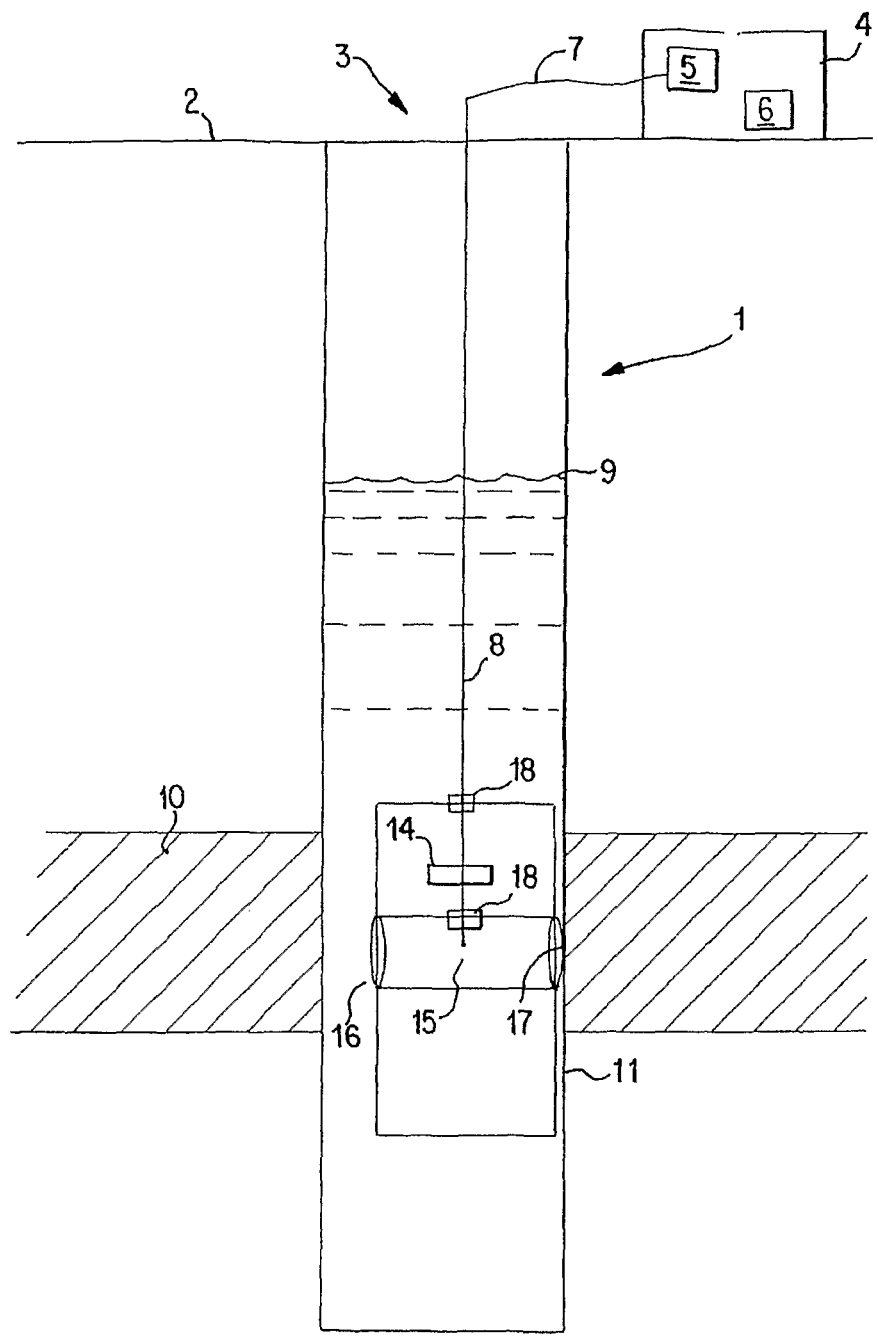
FIG. 16 shows a diagram of a measuring device.

The apparatus to carry out certain preferred embodiments of the invention includes as shown in FIG. 16 a partial pressure sensor or measuring device and a comparator for comparing the methane partial pressure to the isotherm. In one embodiment the partial pressure measuring device includes a concentration measuring device and a calibration system to calibrate the concentration of dissolved methane to the partial pressure. The apparatus may include other sensors such as a temperature sensor, salinity sensor and/or a pressure sensor. The measurements for each of these may be used by the calibration system in order to determine the methane partial pressure.

In a preferred embodiment shown in FIG. 16, a coal bed methane well 1 with a borehole 3 extends from a well head to a coal seam 10 with a side surface 11 and an aquifer fed water level 9. A Raman spectrometer 4 is located at surface 2 at or near the wellhead and includes a radiation source 5 for producing a radiation to transmit down the borehole 3 to a sample interface 17. The radiation from the radiation source is transmitted by way of at least one optical pathway 7. The sample, in this case being water, interacts with the radiation transmitted from the radiation source 5, and a characteristic radiation for the sample is produced by the interaction. The characteristic radiation is then transmitted by an optical pathway 7 to a detector 6 located in the spectrometer 4 at the surface. A suitable optical pathway 7 for transmission is optical fiber 8. The system used to measure the concentration may also contain other measuring devices for salinity or electrical conductivity as well as temperature and pressure. Preferably, the system will measure the temperature and the electrical conductivity of the reservoir fluid with the concentration. This will allow a more accurate determination of the methane partial pressure in the reservoir fluid The optical fiber 8 extends down the borehole 3 to the housing 12 and feeds into the housing through a high-pressure feed-through jacket 18. The jacket 18 allows the fiber 8 to enter the housing 12 without subjecting the housing to the conditions down the well, such as high pressure, particles and the water. The housing protects any filter 14 or other instrumentation enclosed by the housing. The fiber 8 may extend out of the housing through another jacket 18 to optically couple the sample or substance of interest. A tip 15 of the fiber 8 supplies the radiation from the radiation source 5 and collects the characteristic radiation. A system which includes a concentration sensor for use downhole may be preferable due to its size and speed. An optical instrument for use down a well is comprised of a radiation source which is directed through a series of optical components to a sampling interface where the radiation interacts with a sample that is outside of the instrument and across this interface. The returning radiation is then directed through a series of optical components to a spectrometer. A controlling device inputs operating parameters for the spectrometer and packages spectral data for delivery to an uphole computer. The entire instrument is packaged in a steel housing, with additional sensors for pressure, temperature, and conductivity incorporated into the housing endcap. The instrument is attached to a cable head and lowered into a wellbore by a wireline winch. The uphole computer and software allows a user to set operating parameters for the instrument and graphically display data delivered from the controlling device.

The optical fiber 8 may be a bundle of fibers where the center fiber transmits the radiation from the radiation source 5 and the other fibers transmit the characteristic radiation. A single collection fiber for the characteristic radiation may also be used. The fiber 8 may also include a lens. The fibers use a polished tip or fused tip. A calibration file is created by correlating response and spectra of dissolved methane to known concentrations of dissolve methane. The calibration file is used to predict methane concentration from the spectra delivered uphole by the instrument. Several additional calibrations are created at various temperatures and salinities to develop a library of Henry's law constants to be used in order to calculate methane partial pressure. The values of temperature and conductivity measured downhole are used to choose an appropriate Henry's law constant from the library and calculate a methane equilibrium partial pressure for the reservoir from the concentration measured by the instrument. This methane equilibrium partial pressure is a critical desorption pressure. As the total pressure (hydrostatic pressure) falls below the critical desorption pressure, the well begins stable gas production.

The sample interface includes an inlet 16 and an outlet 17 for the water in the well. The water flows into the inlet when the housing is positioned down the well at a depth and flows around the tip 15 of the fiber to thereby interact with the radiation from the radiation source 5. Once critical desorption pressure is known for the reservoir, gas content is calculated using the value for critical desorption pressure in conjunction with an isotherm that is representative of the coal's ability to sorb methane. An isotherm is a plot of total methane pressure with respect to a coal's holding capacity for methane, in standard cubic feet of gas per ton of coal. A technique as describe above may be used to determine an isotherm.

The rate at which the hydrostatic pressure head (water level) can be lowered depends on the discharge rate of the pump, the well completion method, relative permeability of the reservoir and reservoir recharge rate. By noting the static water level before water discharge begins, one can monitor the hydrostatic pressure drop with a pressure transducer attached just above the pump and determine the rate at which the hydrostatic pressure drops with respect to total water discharge. This rate can be used to predict the time need to reach the critical desorption pressure of the well or the dewatering time as described above.

The depletion area of water from the reservoir, or cone of depression, can be modeled using hydrological assumptions and water discharge rates to determine the lateral extent of reservoir at or below the critical desorption pressure and actively contributing to stable gas production.

As the exemplary descriptions have been used to explain the invention with regard to coalbed methane they should also be considered to include the determination with regard to coal shale and other carbonaceous formations, and they should be considered to include the determination with regard to carbon dioxide, nitrogen, other hydrocarbons, and other gases, in addition to the methane as mentioned. The exemplary descriptions with regard to measuring or determining concentration and the production factors should also be considered to include other precursor variables and is not meant to be limiting.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of determining a production factor for a carbonaceous material reservoir, the method comprising:
   providing a well in a carbonaceous material reservoir;
   providing unsampled fluid at a depth in the well;
   placing a sensor adjacent the unsampled fluid and performing a measurement on the unsampled fluid;
   using data from the measurement to determine a partial pressure of a solution gas in the carbonaceous material reservoir; and
   determining a production factor for the carbonaceous material reservoir from the partial pressure of the solution gas.

2. The method of claim 1, wherein the carbonaceous material reservoir is a coalbed methane well and the solution gas is methane or other substance indicative of methane.

3. The method of claim 2, wherein the unsampled fluid is wellbore fluid that is at equilibrium with reservoir fluid in the carbonaceous material reservoir.

4. The method of claim 2, wherein the unsampled fluid is reservoir fluid extracted from the carbonaceous material reservoir.

5. The method of claim 2, wherein the production factor is selected from the group consisting of critical desorption pressure of methane, coal gas content, material gas content, dewatering time, and an amount of reserves present in the formation.

6. The method of claim 2, wherein the partial pressure is determined via measurement of a concentration of methane dissolved in the fluid.

7. The method of claim 1, wherein the carbonaceous material reservoir has a coal seam and the unsampled fluid is measured at a depth in the well close to the coal seam.

8. The method of claim 1, wherein performing a measurement on the unsampled fluid includes:
   transporting the unsampled fluid from said depth in the well to the surface of the well without collecting a discrete sample of the fluid or substantially altering the fluid properties of said unsampled fluid; and
   passively measuring the unsampled fluid using the sensor at the surface.

9. The method of claim 1, wherein the partial pressure is selected from the group consisting of: a partial pressure of methane in the fluid; a partial pressure of nitrogen in the fluid, and a partial pressure of carbon dioxide in the fluid.

10. The method of claim 1, wherein the step of determining of the partial pressure is selected from the group consisting of: determining a concentration of methane in a well fluid, determining a concentration of methane in a reservoir fluid, and combinations thereof.

11. The method of claim 1, wherein the step of determining the partial pressure includes correlating a partial pressure of the solution gas to a partial pressure of methane in the reservoir.

12. The method of claim 1, wherein the step of determining the partial pressure includes correlating a partial pressure of a reservoir fluid to a partial pressure of methane in the reservoir.

13. The method of claim 1, wherein the step of determining the partial pressure includes correlating the concentration of methane to the partial pressure.

14. The method of claim 1, wherein the step of placing a sensor includes placing a concentration sensor.

15. The method of claim 1, wherein the step of placing a sensor includes placing a partial pressure sensor.

16. The method of claim 1, wherein the step of placing a sensor includes placing an optical spectrometer.

17. The method of claim 1, wherein the step of placing a sensor includes placing a Raman spectrometer.

18. The method of claim 1, wherein the step of performing a measurement on the unsampled fluid comprises observing a depth at which methane cavitates from well fluid and determining the fluid pressure at said observed depth.

19. A method of determining a production factor for a coal bed methane well, the method comprising:
    providing a well in a coal bed reservoir;
    providing unsampled fluid at a depth in the well;
    measuring the pressure of the unsampled fluid;
    measuring a concentration or partial pressure of methane or another substance indicative of a partial pressure of methane in the unsampled fluid; and
    correlating the concentration or partial pressure to a gas content of the coal bed reservoir or a critical desorption pressure of the coal bed methane well.

20. The method of claim 19, wherein the correlating is adjusted to account for a non-equilibrium between the unsampled fluid and reservoir fluid.

21. A system for determining a production factor of a coalbed methane well, the system comprising:
    a sensor capable of measuring a partial pressure of gas in a coal bed methane well wherein the gas is in unsampled well fluid or the concentration of gas in the unsampled well fluid;
    a temperature, conductivity and/or pressure transducer to measure temperature, conductivity and/or pressure of the fluid at the measurement point;
    a correlator, adjusted for temperature, conductivity and/or pressure of the fluid at the measurement point, to correlate the concentration of gas in the fluid to the partial pressure of the gas in the fluid; and
    a correlator to correlate the partial pressure of the gas in the fluid to a production factor of the coal seam.

22. The system of claim 21, wherein the partial pressure sensor includes an Raman spectrometer.

* * * * *